United States Patent Office 3,706,529
Patented Dec. 19, 1972

3,706,529
SACCHARINE ASSISTED BASIC DYEING OF NYLON
Egon H. Hacklander, Spartanburg, S.C., and Julian J. Hirshfeld and Bertie J. Reuben, Decatur, Ala., assignors to Monsanto Company, St. Louis, Mo.
No Drawing. Continuation-in-part of abandoned application Ser. No. 613,763, Feb. 3, 1967. This application Apr. 3, 1970, Ser. No. 25,583
Int. Cl. D06p 5/06
U.S. Cl. 8—172
12 Claims

ABSTRACT OF THE DISCLOSURE

The dyeing of nylon with basic dyes is improved through the addition of from about 1 to 10 grams per liter of saccharine to a dyebath containing a basic dye and maintained at a temperature within the range of from about 150° to about 212° F.

BACKGROUND OF THE INVENTION

This is a continuation-in-part of patent application, Ser. No. 613,763 filed Feb. 3, 1967, now abandoned.

This invention relates to dyeing nylon with basic dyes. More specifically, this invention relates to the use of saccharine as a dyeing assistant for using basic dyes in the dyeing of nylon.

Heretofore, dyeings of nylon with basic or cationic dyes have exhibited exceptionally poor light fastness. A number of approaches with both basic and cationic dyes accompanied with certain active agents have been made to overcome this disadvantage.

On account of the brilliance and tinctorial power of basic dyestuffs, many attempts have been made to apply them to polyamides. However, until now it has not been possible to obtain full depth and satisfactory color fastness, especially light fastness. It has been found that the presence of saccharine during the applications of basic dyestuffs to polyamides enhances the dyeing and produces deep shades having satisfactory light fastness. This beneficial effect was observed in the presence of soluble and insoluble saccharines.

Further, regardless of whether the dyes used are disperse, anionic, or basic, high dyebath temperatures, such as boiling temperatures, are usually required. This fact alone increases the cost of dyeing substantially. Such costs diminish rapidly as the temperature of the dyebath is reduced.

Because of their very high brilliancy, it would indeed be desirable to be able to use basic dyes for dyeing nylon. Many attempts have been made to overcome various problems, but until now none have been entirely satisfactory.

In this invention the difficulties of the prior art are overcome by adding a small amount of saccharine to a dyebath containing basic dyes.

It is therefore an object of this invention to provide a suitable dyeing assistant for nylon.

Another object of this invention is to provide a method of satisfactorily dyeing nylon with basic dyes.

Further, it is an object of this invention to dye nylon fibers with basic dyes to exhibit good light fastness.

Also, it is an object of this invention in such a manner that the fibers provide a dyeing assistant for dyeing nylon with basic dyes at temperatures lower than boil.

These and other objects and advantages will become more readily apparent when read in conjunction with the following detailed description.

It was discovered that saccharine, which we know and use mainly as a sweetner today, could be used very effectively as a dyeing assistant. Saccharine as an acid has the formula

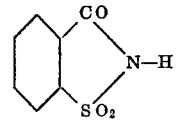

and is called the imide of o-sulfobenzoic acid, the anhydried of o-sulfaminbenzoic acid, or the imide of the mixed anhydride of o-carboxybenzeonesulfonic acid, and is slightly soluble in water. It has a pH of about 2.5 being acidic in character. The hydrogen can be replaced to produce a large number of soluble and insoluble salts most of which have no real use. The sweetner saccharine which we generally use today is a sodium salt of the above acid having the formula

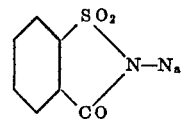

The calcium salt of saccharine has the following formula

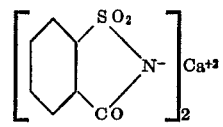

The objects of this invention are accomplished by treating an article comprised of nylon with basic dyes comprising, dyeing the article in an aqueous dyebath comprised of at least one compound containing saccharine, alkali and alkaline earth metal salts of saccharine and at least one basic dye.

For purposes of this invention the term saccharine, where not otherwise pointed out, includes both the acid and salt forms, and includes compounds containing the radical

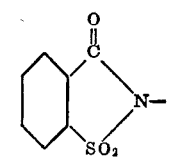

Also, combinations of compounds containing the above radical may be used in conjunction with one basic dye or a combination of dyes.

The salt forms of saccharine include the alkali and alkaline earth metals. Moreover, the calcium and sodium salts of saccharine are the preferred embodiments herein. These forms may be readily added to conventional aqueous dyebaths during the commercial processing of articles comprised of nylon to greatly enhance and intensify the dyeing thereof.

The dyes which can be satisfactorily applied in the practice of this invention include all those known as basic dyes. These are a well-recognized class of cationic dyes which are commercially available and which are characterized by their very high brilliancy.

The employment of saccharine either in the salt or acid form markedly enhances and assists in the dyeing of nylon with basic dyes. Simply, nylon dyed with basic dyes after this invention display a deeper shade and improved lightfastness.

In order that the present invention may be more fully understood, the following examples are given primarily by way of illustration. No details appearing therein should be construed as limitations on the present invention except as they appear in the appended claims.

Example I

Swatches of tape knit from nylon 6,6 were dyed with the following basic dyestuffs at the boil for 60 minutes in the presence of 5 grams per liter of a sodium salt of saccharine. The table below illustrates the effects of saccharine upon dyeing using basic dyestuffs with regard to light fastness.

TABLE

| | Control | | Using 5 g./l. saccharine | |
|---|---|---|---|---|
| Basic dye | 20 SFH | 40 SFH | 20 SFH | 40 SFH |
| 1. C.I. Basic Yellow 21, C.I. 48060 | 2 | 1 | 3 | 2-3 |
| 2. C.I. Basic Blue 44, C.I. 51004 | 2-3 | 2 | 3 | 2-3 |
| 3. C.I. Basic Yellow 15 [1] | 2-3 | 2 | 3-4 | 3 |

[1]
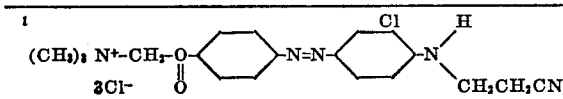

The results in the table were based on a standard fading hour (SFH) as accepted by the AATCC (American Association of Textile Chemists and Colorists) using AATCC test 16 A-1964, Colorfastness to Light. Carbon arc lamp continuous light. The results of the tests were based on values ranging from 1 (very poor) to 8 (outstanding), with 2 being poor, 3 being fair, and 4 being fairly good.

Example II

The same results which are illustrated in the table above were obtained under the same conditions except a calcium salt of saccharine was used instead of the sodium salt.

Example III

Saccharine in the acid form was used under the same conditions existing in Examples I and II with the results being diminished by 20 to 30%, but still acceptable.

Example IV 5 grams per liter was found to be the optimum amount of saccharine (either salt or acid) to be applied to the dyebath. Below 5 grams per liter the effects were noticeable between the limits of 1 and 3 grams per liter, but above 5 grams per liter the improvement was only very slight, being negligible above 10 grams per liter. Therefore, the outer limits of this invention with regard to the amount of saccharine used can be defined between 1 and 10 grams per liter based on the volume of the dyebath.

Example V

With regard to Examples I through III tests were conducted wherein the temperature of dyeing was varied from the boil. It was found that with a concentration of 5 grams per liter (which is optimum regardless of dyeing temperatures tested) of saccharine in either the salt or acid form, the optimum dyeing temperature was about 165° F. At this temperature there was no variance from the lightfastness values given in the table, but there was a substantial difference in terms of greater shade build-up and brilliance of hue.

Example VI

The tests of Examples I-V were repeated using samples (knit tape) of nylon 6 with the results showing that nylon 6 dyed somewhat heavier than nylon 6,6.

Example VII

Swatches (knit-tape) of nylon 6,6 were dyed with the following basic dyestuffs 1.0% Sevron Yellow R
C.I. Basic Yellow II 1.0% Genacryl Orange G
C.I. Basic Orange 21

1.0% Maxilon Pink GA
C.I. Basic Red 22

1.0% Genacryl Blue 6G
C.I. Basic Blue 1

1.0% Victoria Greens Extra Conc.
C.I. Basic Green 4 at a bath temperature of 205° F. for 30 minutes. One set of swatches was dyed in a bath having therein sodium saccharine and another set was dyed in a bath containing calcium saccharine. A control was run having no saccharine assistance. All samples in which the saccharine salt was used showed very deep dyeings.

The fact that nylon may now be dyed with basic dyestuff through the use of saccharine at temperatures on the order of 165° F. is indeed a significant improvement. The cost of heating water to the boil in terms of apparatus and fuel is excessive, while the cost of heating water to 165° is minimal in comparison.

The control samples were treated in the same way as were the test samples except the control samples were dyed in the absence of saccharine.

We claim:

1. A process for dyeing an article comprised of nylon with basic dyes, comprising:
   dyeing the article from an aqueous dyebath comprised of
   at least one compound containing saccharine, alkali and alkaline earth metal salts of saccharine and
   at least one basic dye.

2. A process as recited in claim 1 wherein the dyebath is maintained at a temperature within the range of from about 150° to 212° F.

3. A process as recited in claim 1 wherein the amount of the compound containing saccharine, alkali and alkaline earth metal salts of saccharine is from about 1 to about 10 grams per liter, based on the volume of the dyebath.

4. A process of dyeing an article comprised of nylon with basic dyes comprising:
   dyeing the article from an aqueous dyebath comprised of at least one compound containing saccharine, alkali and alkaline earth metal salts, said dyebath being at a temperature from about 150° F. to about 212° F., and wherein the amount of the compound is from about 1 to about 10 grams per liter, based on the volume of the dyebath.

5. A process as recited in claim 4 wherein the temperature of the dyebath is maintained at about 165° F.

6. A process as recited in claim 4 wherein the amount of the compound is about 5 grams per liter, based on the volume of the dyebath.

7. A process of dyeing an article comprised of nylon with basic dyes, comprising:
   dyeing the article from an aqueous dyebath, said dyebath being at a temperature of about 165° F., comprised of at least one compound containing saccharine, alkali and alkaline earth metal salts of saccharine, and wherein the amount of the compound is about 5 grams per liter, based on the volume of the dyebath and at least one basic dye.

8. A process according to claim 7 wherein the compound is selected from the group consisting of sodium and calcium salts of saccharine.

9. A process according to claim 7 wherein the compound is the imide of the mixed anhydride of O-carboxybenzene sulfonic acid.

10. A dyebath for dyeing an article comprised of nylon with basic dyes containing
    at least one compound containing saccharine, alkali and alkaline earth metal salts of saccharine and
    at least one basic dye.

11. A dyebath for dyeing an article of nylon with basic dyes, at a temperature within the range from about 150°

F. to about 212° F. comprised of a compound selected from the group consisting of saccharine, alkali and alkaline earth metal salts of saccharine and containing from about 1 to 10 grams per liter, based on the volume of the dyebath, and at least one basic dye.

12. A dyebath for dyeing an article comprised of nylon with basic dyes, at a temperature of about 165° F., comprised of about 5 grams per liter of at least one compound selected from the group consisting of saccharine, sodium and calcium salts of saccharine and at least one basic dye.

References Cited

UNITED STATES PATENTS

| | | | |
|---|---|---|---|
| 2,214,405 | 9/1940 | Coffman | 8—Dig. 21 |
| 2,491,936 | 12/1949 | Schlattman | 8—Dig. 21 |
| 2,922,690 | 1/1960 | Mueller et al. | 8—21 R |

OTHER REFERENCES

Lynn, Advances in Textile Processing, vol. 1, pp. 358–363 pub. 1961 by Interscience Publ. Inc., New York City.

Douglas, Amer. Dyestuff Rep., 1951, pp. 122–126, TP890A512.

Schmidlen, Preparation and Dyeing of Synthetic Fibres, pp. 152–153 and 227, pub. by Chapman and Hall, London, England.

DONALD LEVY, Primary Examiner

U.S. Cl. X.R.

8—86